(12) United States Patent
Bauer et al.

(10) Patent No.: US 12,255,364 B2
(45) Date of Patent: Mar. 18, 2025

(54) MEMBRANE ASSEMBLY FOR A HUMIDIFICATION DEVICE

(71) Applicant: Mahle International GmbH, Stuttgart (DE)

(72) Inventors: Swen-Juri Bauer, Stuttgart (DE);
Andreas Gruener, Hattenhofen (DE);
Stefan Kaiser, Remseck (DE);
Aleksandar Radlovic, Stuttgart (DE);
Lukas Schikora, Esslingen (DE);
Alexander Tuntukas, Stuttgart (DE)

(73) Assignee: Mahle International GmbH (DE)

( * ) Notice: Subject to any disclaimer, the term of this patent is extended or adjusted under 35 U.S.C. 154(b) by 694 days.

(21) Appl. No.: 17/347,571

(22) Filed: Jun. 14, 2021

(65) Prior Publication Data

US 2021/0391586 A1 Dec. 16, 2021

(51) Int. Cl.
*H01M 8/04119* (2016.01)
*B01D 63/08* (2006.01)
*B01D 65/00* (2006.01)

(52) U.S. Cl.
CPC .... *H01M 8/04149* (2013.01); *B01D 63/0822* (2022.08); *B01D 65/003* (2013.01); *H01M 8/04141* (2013.01); *B01D 2313/042* (2022.08)

(58) Field of Classification Search
CPC .......... B01D 63/0822; B01D 2313/025; B01D 2313/14; B01D 63/082; B01D 69/06; B01D 2325/20; H01M 2008/1095; Y02E 60/50; Y02P 70/50
See application file for complete search history.

(56) References Cited

U.S. PATENT DOCUMENTS

| 8,828,617 B2 | 9/2014 | Martin |
| 8,968,945 B2 | 3/2015 | Fasold et al. |
| 9,806,362 B2 | 10/2017 | Fasold et al. |
| 10,044,051 B2 | 8/2018 | Fasold |

(Continued)

FOREIGN PATENT DOCUMENTS

| CN | 101682047 A | 3/2010 |
| CN | 102257663 A | 11/2011 |

(Continued)

OTHER PUBLICATIONS

Chinese Office Action dated Jan. 4, 2024 and Chinese Search Report dated Jan. 2, 2024 for Chinese Patent Application No. 202110659454.

*Primary Examiner* — Adam A Arciero
(74) *Attorney, Agent, or Firm* — Fishman Stewart PLLC

(57) ABSTRACT

A membrane assembly for a humidification device of a fuel cell system may include a membrane. The membrane may be permeable to water and impermeable to air. The membrane may extend in a flat form in a longitudinal direction and in a transverse direction that is transverse with respect to the longitudinal direction in an extent plane. The membrane may include in a height direction extending transversely with respect to the longitudinal direction and transversely with respect to the transverse direction a top side and a bottom side averted from the top side. The membrane may include an encircling outer margin in the extent plane. The outer margin may have an upper edge at the top side and a lower edge at the bottom side, between which an encircling face surface extends.

20 Claims, 5 Drawing Sheets

(56) References Cited

U.S. PATENT DOCUMENTS

| | | |
|---|---|---|
| 2010/0173226 A1 | 7/2010 | Oomori |
| 2012/0034546 A1 | 2/2012 | Erdmann |
| 2013/0101909 A1 | 4/2013 | Fasold |
| 2015/0171445 A1* | 6/2015 | Fasold .................. B01D 69/12 |
| | | 261/105 |

FOREIGN PATENT DOCUMENTS

| | | |
|---|---|---|
| CN | 102388493 A | 3/2012 |
| CN | 103066308 A | 4/2013 |
| CN | 104584301 A | 4/2015 |
| CN | 105226311 A | 1/2016 |
| CN | 206410232 U | 8/2017 |
| DE | 10 2012 019 541 A1 | 4/2013 |
| DE | 10 2012 017 142 A1 | 3/2014 |
| JP | 2011216324 A | 10/2011 |
| WO | 0010216 A1 | 2/2000 |
| WO | WO-2000/10 216 A1 | 2/2000 |

* cited by examiner

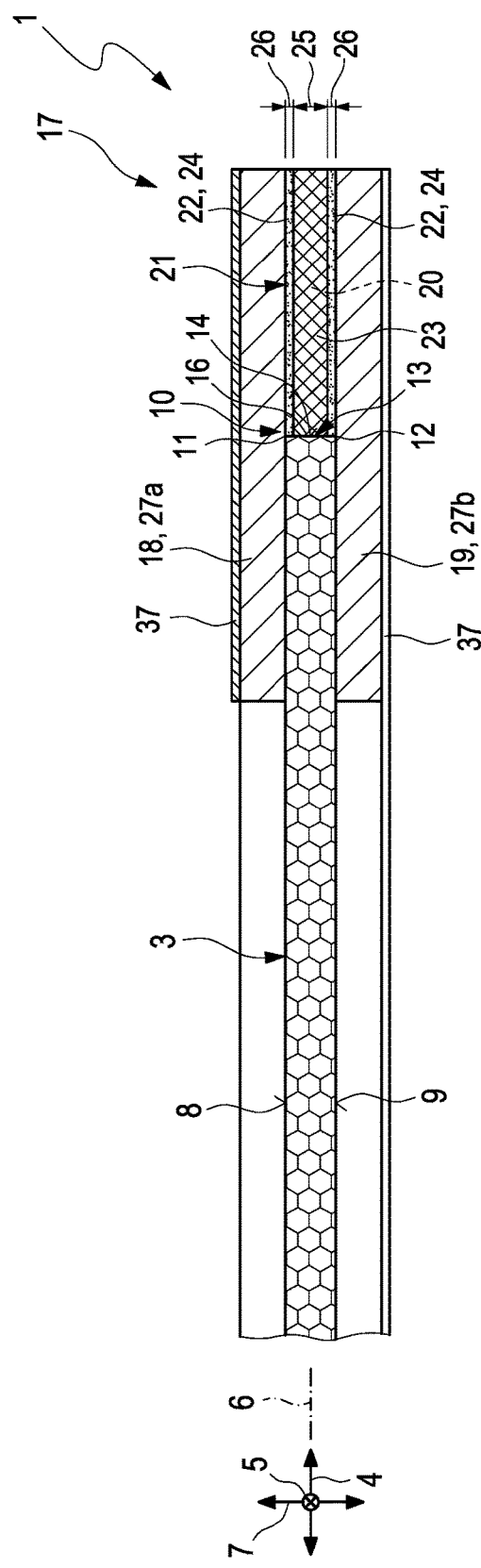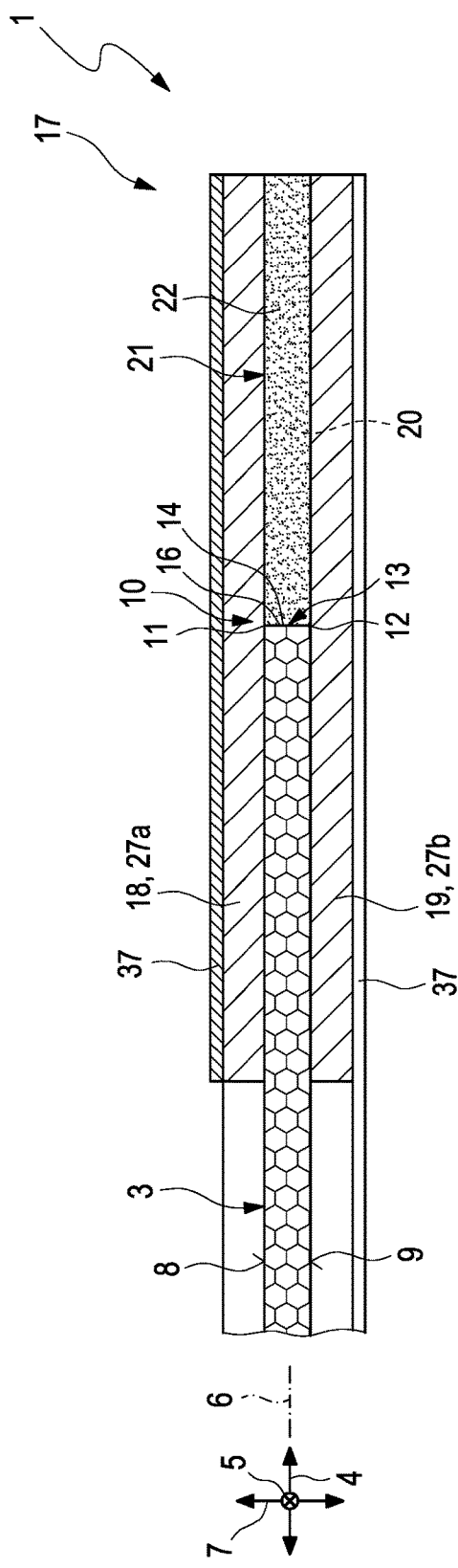

MEMBRANE ASSEMBLY FOR A HUMIDIFICATION DEVICE

CROSS-REFERENCE TO RELATED APPLICATION

This application claims priority to German Application No. DE 10 2020 207 350.3 filed on Jun. 15, 2020 the contents of which are hereby incorporated by reference in its entirety.

TECHNICAL FIELD

The present invention relates to a membrane assembly for a humidification device, in particular of a fuel cell system, which has a membrane which is permeable to water and impermeable to air. The invention furthermore relates to a humidification device having at least two such membrane assemblies.

BACKGROUND

A humidification device serves for humidifying a gas. For this purpose, the humidification device commonly has multiple membranes which are flowed through on one side by the gas for humidification, hereinafter generally also referred to as air, and on the other side by a gas mixture with elevated humidity. The respective membrane is permeable to water and impermeable to air. Consequently, the water is transported through the membrane from the gas mixture to the air and humidifies the air.

In order, in the humidification device, to be able to separate the flow of the air and of the gas mixture in a desired manner, in particular in order to prevent mixing of air and gas mixture, it is necessary for the membranes to be correspondingly sealed off. This is commonly realized by means of the attachment of a seal arrangement to a face surface of the respective membrane.

Such a humidification device is known for example from DE 10 2012 019 541 A1. The humidification device has multiple membranes which extend in flat form in an extent plane and which, at the outside, have an outer margin with a face surface. The membranes are arranged so as to follow one another transversely with respect to the extent direction, wherein a spacer is arranged between adjacent membranes. An adhesive is applied as sealing compound in each case between the membranes and the spacers, and to face surfaces of the membranes, in order to achieve the desired seal. In order to achieve the desired sealing action with a seal arrangement, in particular with an adhesive, compression of the seal arrangement is necessary. This requires a corresponding exertion of force on the membranes. The exertion of force on the membranes can lead to damage to and/or deformation of the membranes.

Membranes used in humidification devices are commonly membranes with a porous structure. Accordingly, the force action required for attaining the sealing action can lead to increased deformation of and/or damage to the membranes.

The damage to the membranes leads to corresponding damage to the humidification device, which leads to a reduction in the efficiency of the humidification device.

The present invention is therefore concerned with the problem of specifying, for a membrane assembly for a humidification device of the type mentioned in the introduction, and for such a humidification device, improved or at least different embodiments which are distinguished in particular by increased efficiency and/or a lengthened service life.

Said object is achieved according to the invention by means of the subjects of the independent claims. Advantageous embodiments are the subject of the dependent claims.

SUMMARY

The present invention is based on the general concept of providing a membrane for a humidification device in a membrane assembly, in which the membrane is enclosed at the outside, wherein the enclosure projects outwards beyond the membrane and thus forms a gap at an outer face surface of the membrane, and wherein a seal arrangement for sealing off the face surface of the membrane is arranged in said gap. The action of force on the seal arrangement, as is required for achieving the desired seal action, thus takes place via the enclosure, such that a corresponding exertion of force on the membrane is eliminated or at least reduced. Consequently, damage to and deformation of the membrane are prevented or at least reduced. The prevention or at least reduction of the occurrences of deformation of and/or damage to the membrane has the effect that the membrane allows an improved exchange of water, such that the efficiency of the membrane assembly and of the associated humidification device is improved. Furthermore, the prevention or at least reduction of the occurrences of deformation and damage has the effect that the occurrences of damage or deformation do not propagate over the service life of the membrane assembly and of the associated humidification device. Consequently, efficiency is improved over a longer period of time, and/or the service life of the membrane assembly and of the associated humidification device with an improved level of efficiency is lengthened.

According to the concept of the invention, the membrane assembly has a membrane which is permeable to water and impermeable to air. The membrane extends in flat form in an extent plane which runs in a longitudinal direction and in a transverse direction running transversely with respect to the longitudinal direction. Here, in a height direction running transversely with respect to the longitudinal direction and transversely with respect to the transverse direction, the membrane has a top side and a bottom side averted from the top side. At the outside in the extent plane, the membrane has an encircling outer margin which has an upper edge at the top side and a lower edge at the bottom side. An encircling face surface of the membrane extends between the upper edge and the lower edge. According to the invention, the membrane assembly has an enclosure which is arranged at the outside in the extent plane. The enclosure has at least one upper web, which lies on the top side, and at least one lower web, which lies on the bottom side, which webs each project outwards beyond the outer margin. In this way, a gap is formed between the webs, which gap is delimited by the face surface. According to the invention, a seal arrangement for sealing off the face side is arranged in the gap, wherein the seal arrangement is subjected to mechanical load in the height direction by the webs in order to seal off the face surface. Furthermore, the membrane assembly is thus easy to handle, and can in particular be transported and stacked more easily by way of the enclosure. Furthermore, the membrane assembly has an integrated seal of the membrane. Consequently, the production and assembly of an associated humidification device are also considerably simplified.

The membrane may in principle have any desired structure as long as it is permeable to water and impermeable to air. In particular, the membrane may have a porous structure.

In the present context, water is to be understood to mean both the liquid phase and the gaseous phase of water, that is to say in particular steam.

In the present case, air is to be understood to mean a gas or a gas mixture which is humidified by means of the membrane during operation. For this purpose, the membrane is, in an associated humidification device, flowed through along the top side by air and along the bottom side by a water-containing gas mixture, wherein the gas mixture expediently has higher water humidity than the air. It is self-evidently also possible for the membrane, in the humidification device, to be flowed around along the top side by the gas mixture and along the bottom side by air. Here, the seal arrangement separates the flow of the air and the flow of the gas mixture. In particular, mixing of the gas mixture and of the air across the membrane assembly is prevented by means of the seal arrangement.

The enclosure is expediently dimensionally stable in relation to the membrane. In particular, the enclosure is not porous in relation to the membrane. The enclosure is preferably furthermore fluid-tight. The enclosure may for example be a hard plastic, in particular a thermoplastic such as polyester.

The seal arrangement may in principle be of any desired configuration as long as it seals off the face surface in the region in which said seal arrangement is arranged.

It is preferable if the seal arrangement fills the gap in the region in which the seal arrangement is arranged. In particular, the seal arrangement fills the gap completely. An improved seal is thus achieved with the seal arrangement. Furthermore, in this way, the force required for the mechanical exertion of load on the seal arrangement is reduced, such that the mechanical stress on the enclosure is reduced. In this way, it is thus the case that damage to the enclosure is reduced, and/or the provision of a mechanically less stable enclosure is made possible.

In preferred embodiments, the seal arrangement has a sealing adhesive. This allows inexpensive and reliable sealing of the face surface of the membrane.

Embodiments are conceivable in which the seal arrangement is composed of the sealing adhesive. This means that only the sealing adhesive is arranged, and subjected to mechanical load, in the gap between the webs. This allows an inexpensive implementation of the membrane assembly.

It is likewise conceivable that the seal arrangement has, in addition to the sealing adhesive, a seal foil which imparts a sealing action, wherein the seal foil is arranged between two adhesive layers of the adhesive in the height direction. An improved sealing action is thus achieved with the seal arrangement. Furthermore, in this way, the seal arrangement has increased mechanical stability, such that mechanical loads on the enclosure and on the membrane are reduced.

It is preferable if the seal foil has a height running in the height direction, hereinafter also referred to as seal foil height, which is greater than a height, running in the height direction, of the respective adhesive layer, hereinafter also referred to in each case as adhesive layer height.

The seal foil is expediently dimensionally stable in relation to the membrane. The seal foil is in particular a plastic, in particular a hard plastic, for example a thermoplastic such as polyester.

The outer margin of the membrane advantageously has two sections situated opposite one another in the longitudinal direction and two sections situated opposite one another in the transverse direction, wherein the respective section has an associated face side of the face surface. The two sections of the outer margin that are situated opposite one another in the longitudinal direction will hereinafter be referred to, for better distinction, as transverse margins. Furthermore, the two sections of the outer margin that are situated opposite one another in the transverse direction will be referred to, for better distinction, as longitudinal margins. Accordingly, the enclosure has two sections which are situated opposite one another in the transverse direction and which lie on the top side, hereinafter referred to as upper longitudinal webs, and two sections which are situated opposite one another in the transverse direction and which lie on the bottom side, hereinafter referred to as lower longitudinal webs. Furthermore, the enclosure has two sections which are situated opposite one another in the longitudinal direction and which lie on the top side, hereinafter referred to as upper transverse webs, and two sections which are situated opposite one another and which lie on the bottom side, hereinafter referred to as lower transverse webs. Here, one section of the gap is formed between the longitudinal webs and a further section of the gap is formed between the transverse webs. In at least one of these gap sections, at least one corresponding section of the seal arrangement, hereinafter also referred to as seal arrangement section, is arranged and subjected to load in the height direction by the associated webs, such that the seal arrangement section seals off the associated face side. In other words, a seal arrangement section of the seal arrangement may be arranged between the longitudinal webs, which seal arrangement section is subjected to mechanical load in the height direction by the longitudinal webs and seals off the associated face side of the face surface. Alternatively or in addition, a seal arrangement section of the seal arrangement is arranged between the transverse webs, which seal arrangement section is subjected to mechanical load in the height direction by the transverse webs and seals off the associated face side of the face surface.

The membrane may in principle have any basic shape. This then applies correspondingly to the enclosure. In particular, the membrane may have a circular or oval basic shape.

The membrane preferably has a tetragonal basic shape. This applies correspondingly to the enclosure. In this case, the transverse margins run in the transverse direction and the longitudinal margins run in the longitudinal direction. Furthermore, the longitudinal webs run in the longitudinal direction and the transverse webs run in the transverse direction. This leads to a simplified form of the membrane assembly and, in the associated humidification device, allows improved guidance of the flow paths of the air and of the gas mixture.

Embodiments are advantageous in which the at least one upper web and the at least one lower web are each formed as an encircling frame, between which there is formed an encircling gap which is delimited by the face surface. It is particularly preferable if the at least one upper web and the at least one lower web and thus the enclosure are of encirclingly closed form and thus delimit an encirclingly closed gap which is delimited by the face surface. The membrane assembly can thus be produced more easily, and a mechanical load on the membrane can be further reduced.

In advantageous embodiments, the seal arrangement is of encircling form and seals off the face surface of the membrane in encircling fashion. It is preferable if the seal arrangement is of encirclingly closed form and seals off the entire face surface of the membrane.

It is preferable if both the seal arrangement and the enclosure are of encircling, particularly preferably encirclingly closed form. Thus, the entire face surface of the membrane is sealed off efficiently and with at least reduced mechanical load on the membrane.

In an associated humidification device, the membrane assembly is attached to further constituent parts of the humidification device.

Preferably, for this purpose, the membrane assembly has an adhesive strip at least in certain sections on at least a side of the enclosure which is averted from the gap. The adhesive strip thus serves for the attachment of the membrane assembly to further constituent parts of the humidification device.

It is advantageous here if, to that side of the respective upper longitudinal web which is averted from the gap, there is applied an adhesive strip which extends along the longitudinal web, whereas those sides of the lower longitudinal webs which are averted from the gap are free from adhesive strips. Furthermore, to that side of the respective lower transverse web which is averted from the gap, there is applied in each case one adhesive strip which extends along the transverse web, whereas those sides of the upper transverse webs which are averted from the gap are free from adhesive strips. In an alternative variant, to that side of the respective lower longitudinal web which is averted from the gap, there is applied an adhesive strip which extends along the longitudinal web, whereas those sides of the upper longitudinal webs which are averted from the gap are free from adhesive strips, and wherein, to that side of the respective upper transverse web which is averted from the gap, there is applied in each case one adhesive strip which extends along the transverse web, whereas those sides of the lower transverse webs which are averted from the gap are free from adhesive strips. This means that, in a first variant, the membrane assembly is provided with in each case one adhesive strip on the upper transverse webs, whereas the lower transverse webs are free from adhesive strips, and wherein the upper longitudinal webs are free from adhesive strips, whereas the lower longitudinal webs are provided with adhesive strips, or vice versa in a second variant.

In an associated humidification device, membrane assemblies of the first variant and of the second variant may be provided and arranged so as to follow one another alternately. This leads to simplified production of the humidification device with simultaneously simplified separation of the flow paths of the air and of the gas mixture.

It is self-evident that the scope of this invention encompasses not only the membrane assembly but also an associated humidification device.

The humidification device is flowed through by the air and the gas mixture during operation. That is to say, a flow path for air, hereinafter also referred to as first flow path, and a flow path for the gas mixture, which differs from the first flow path and which is hereinafter also referred to as second flow path, run through the humidification device. The humidification device furthermore has at least two membrane assemblies which are arranged spaced apart from one another in the height direction, such that in each case one of the flow paths leads between the membrane assemblies which follow one another in the height direction. It is preferable if alternately in each case one of the flow paths leads between the membrane assemblies that follow one another in the height direction.

Embodiments are preferred in which a spacer is arranged between at least two of the membrane assemblies that follow one another in the height direction, preferably between every two membrane assemblies which follow one another in the height direction, through which spacer the flow path running between the membrane assemblies runs. A defined spacing of the membrane assemblies in the height direction, and thus a defined structure of the humidification device, are realized by means of the spacer.

It is furthermore preferred if the spacer is used for separating the flow paths in the humidification device. For this purpose, the respective spacer has two fluid-tight holders which are situated opposite one another in the longitudinal direction or in the transverse direction and between which a guide structure of the spacer for guiding the associated flow path is held, wherein the holders are arranged on that side of the associated enclosures which is averted from the gap, and are fastened to the enclosures. The fluidically sealing characteristic of the holders prevents a flow of the gas mixture and of the air through the holders, such that the spacers thus define and delimit the flow paths.

It is preferred here if the humidification device has multiple membrane assemblies which are arranged so as to follow one another in the height direction, wherein, between the membranes which follow one another, there is alternately arranged a spacer with two holders situated opposite one another in the longitudinal direction and two holders situated opposite one another in the transverse direction. Thus, the respective membrane is flowed through on the top side by air in the transverse direction and along the bottom side by the gas mixture in the longitudinal direction or vice versa.

For the fastening of the respective spacer to the membrane assemblies and vice versa, use is advantageously made in each case of an adhesive strip. That is to say, the respective holder is arranged between the two associated enclosures with the two associated membrane assemblies, wherein, between the respective holder and the respective enclosure, there is arranged an adhesive strip which fastens the holder to the enclosure and which extends along the holder. At least a proportion of adhesive strips may in this case, as described above, each be a constituent part of the membrane assemblies. It is also conceivable for at least a proportion of the adhesive strips to be a constituent part of the spacers, and consequently to be applied to the respective holder on the outside in the height direction.

The humidification device may in principle be used in any desired application.

It is conceivable for the humidification device to be used in a fuel cell system in which the humidification device is used for humidifying the oxygen-containing gas that is fed to the fuel cell, in particular the cathode gas, as air. In the case of use in a fuel cell system, the water-containing gas mixture may be the exhaust gas that is generated during the operation of a fuel cell of the fuel cell system.

The humidification device is used in particular in a motor vehicle. Here, the fuel cell system may be a constituent part of a motor vehicle.

Further important features and advantages of the invention will emerge from the dependent claims, from the drawings and from the associated description of the figures with reference to the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein identical reference designations relate to identical or similar or functionally identical components.

BRIEF DESCRIPTION OF THE DRAWINGS

In the drawings, in each case schematically:

FIG. 1 shows a section through a membrane assembly,

FIG. 2 shows the section from FIG. 1 in the case of a different exemplary embodiment of the membrane assembly.

Figure 3:
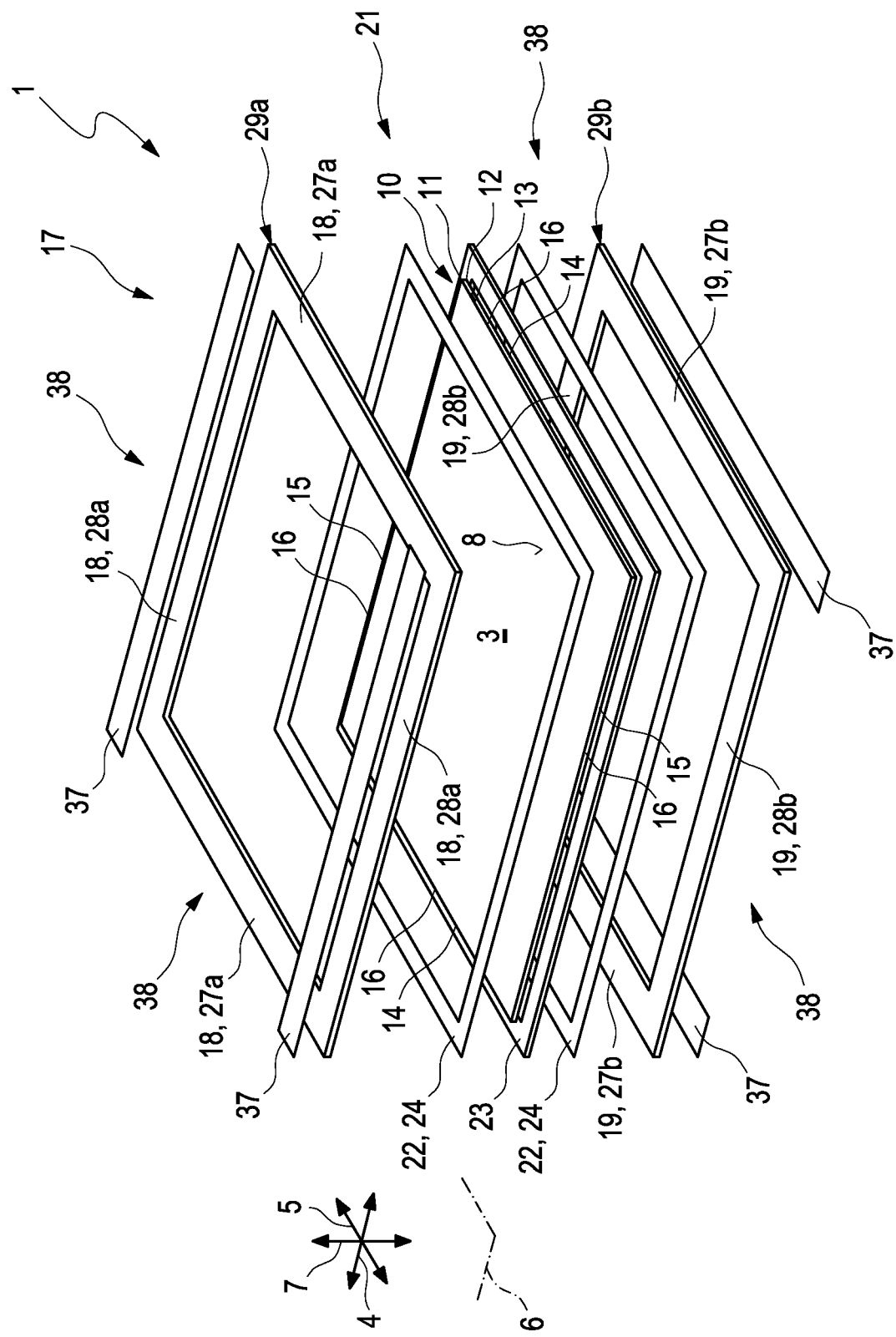
FIG. 3 is an exploded illustration of the membrane assembly from FIG. 1.
Figure 4:
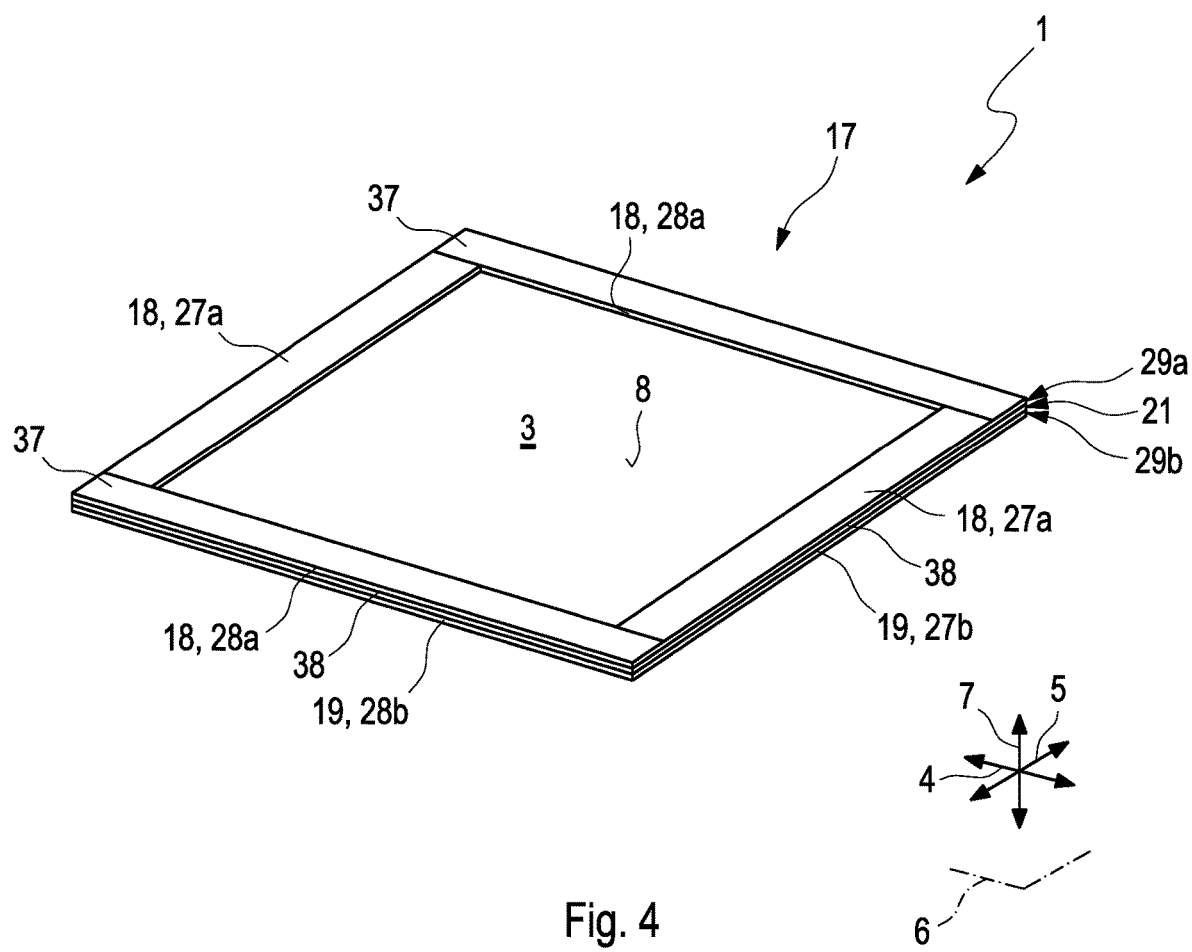
FIG. 4 shows an isometric view of the membrane assembly of FIGS. 1 and 3.
Figure 5:
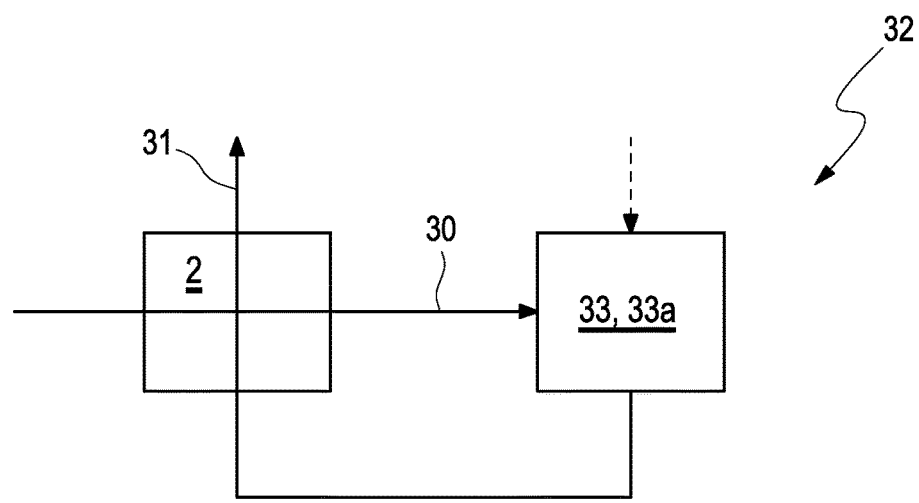
FIG. 5 shows a greatly simplified illustration, in the form of a circuit diagram, of a humidification device with the membrane assembly in a fuel cell system.
Figure 6:
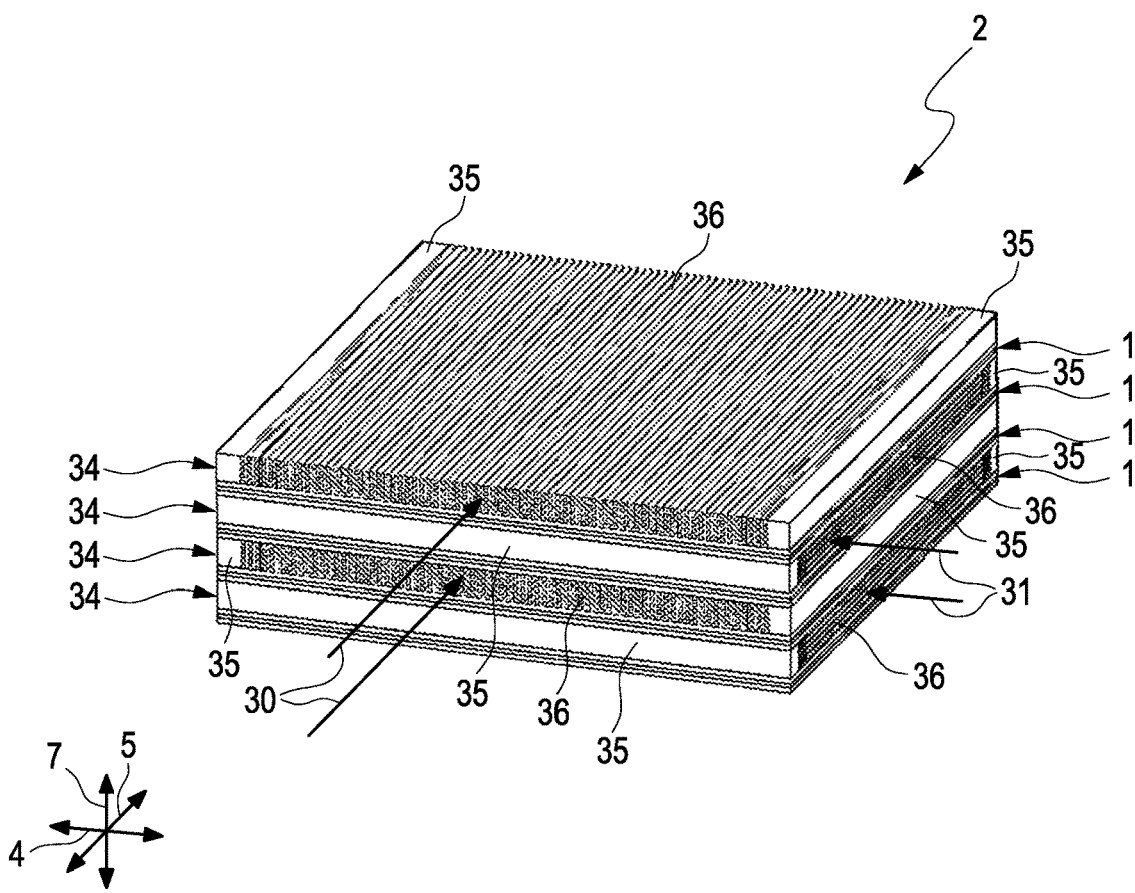
FIG. 6 shows an isometric internal view of the humidification device.
Figure 8:
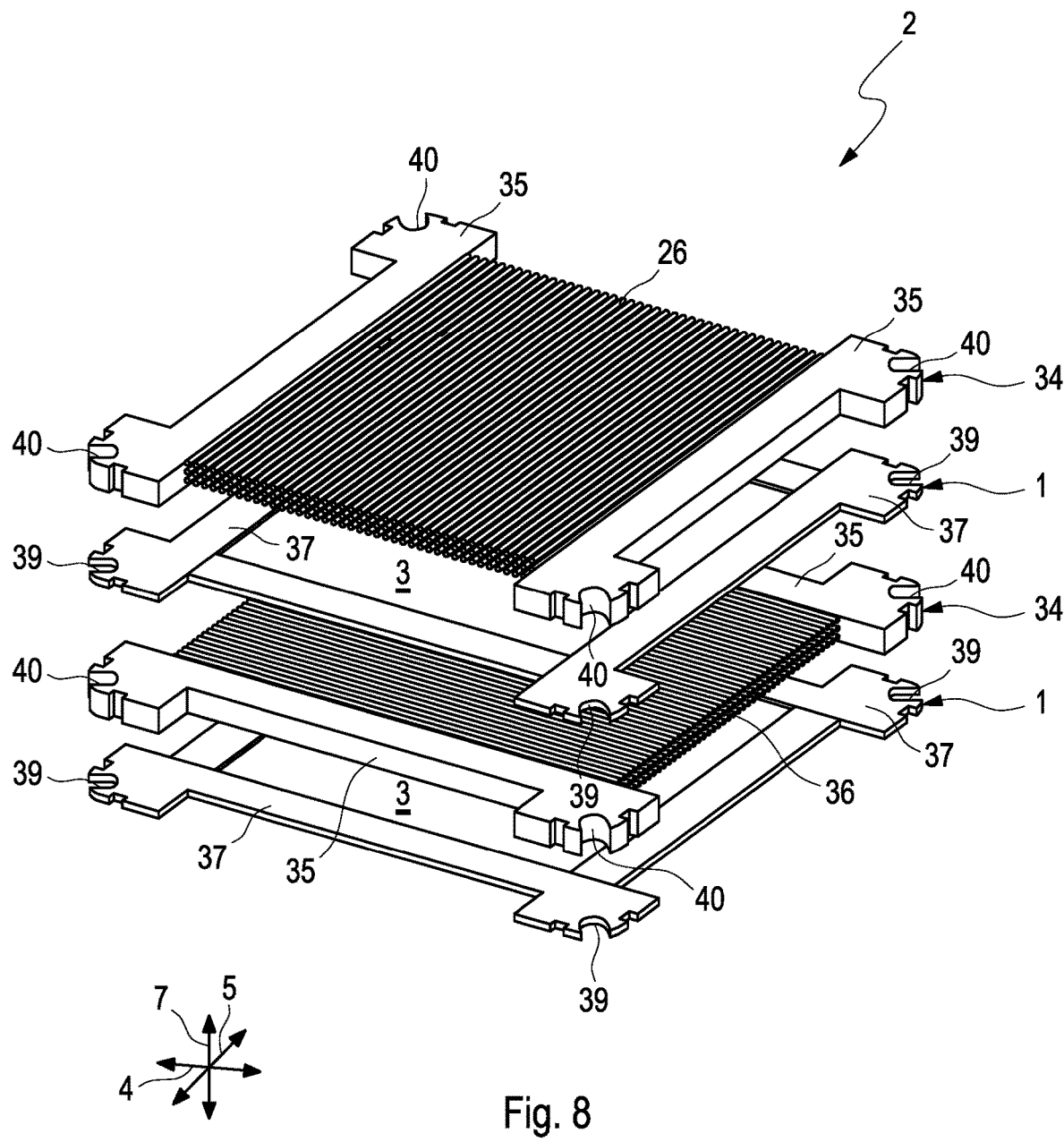
FIG. 8 is an internal isometric exploded illustration of the humidification device in the case of a different exemplary embodiment.

DETAILED DESCRIPTION membrane assembly 1 as shown by way of example in FIGS. 1 to 4 and 6 and 8 is used in a humidification device 2, which is shown for example in FIGS. 5 and 6 and 8.

The membrane assembly 1 has a membrane 3 which is permeable to water and impermeable to air. For this purpose, the membrane 3 is preferably porous. The membrane 3 extends in flat form in a longitudinal direction 4, and in a transverse direction 5 running transversely with respect to the longitudinal direction 4, in an extent plane 6. In a height direction 7 running transversely with respect to the longitudinal direction 4 and transversely with respect to the transverse direction 5, the membrane 3 has a top side 8 and a bottom side 9 averted from the top side 8. Furthermore, at the outside in the extent plane 6, the membrane 3 has an encircling outer margin 10 which has an upper edge 11 at the top side 8 and a lower edge 12 at the bottom side 9. Between the upper edge 11 and the lower edge 12, the outer margin 10 has an encircling face surface 3 of the membrane 3. In the exemplary embodiments shown, the membrane 3 has a basic shape in the form of a rectangle. The outer margin 10 thus has two transverse margins 14, which are situated opposite one another in the longitudinal direction 4 and which run in the transverse direction 5, and two longitudinal margins 15, which are situated opposite one another in the transverse direction 5 and which run in the longitudinal direction 4. Here, the respective transverse margin 14 and longitudinal margin 15 has an associated face side 16 of the face surface 13.

The membrane assembly 1 furthermore has an enclosure 17 which is arranged at the outside in the extent plane 6. The enclosure 17 has at least one upper web 18, which lies on the top side 8, and at least one lower web 19, which lies on the bottom side 9. Here, the respective web 18, 19 projects outwards beyond the outer margin 10, such that a gap 20 delimited by the face surface 13 of the membrane 3 is formed between the webs 18, 19. A seal arrangement 21 of the membrane assembly 1 is arranged in the gap 20. The seal arrangement 21 is subjected to mechanical load in the height direction 7 by the at least one upper web 18 and the at least one lower web 19 and thus seals off the face surface 13 of the membrane 3. Here, the seal arrangement 21 lies against the face surface 13. The enclosure 17 and thus the webs 18, 19 are in this case dimensionally stable in relation to the membrane 3. It is preferred, and can be seen in the exemplary embodiments shown, that the seal arrangement 21 fills the gap 20 completely at least in the height direction 7 and along the face surface 13. In the exemplary embodiments shown, the gap 20 is filled completely by the seal arrangement 21. As a result of the exertion of mechanical load on the seal arrangement 21 by means of the enclosure 17, reliable sealing of the face surface 13 of the membrane 3 is realized. At the same time, an exertion of mechanical load on the membrane 3 for the purposes of subjecting the seal arrangement 21 to load is at least substantially omitted. That is to say, the exertion of mechanical load is omitted or at least reduced. Furthermore, the handling of the membrane 3 is thus considerably simplified.

In the exemplary embodiments shown, the seal arrangement 21 has an adhesive 22. Here, the seal arrangement 21 may, as illustrated in the exemplary embodiment of FIG. 2, be composed of the adhesive 22. The seal arrangement 21 may thus correspond to the adhesive 22. Alternatively, the seal arrangement 21 may, as for example in the exemplary embodiment of FIGS. 1 and 3, have a fluid-tight seal foil 23 in addition to the adhesive 22. The seal foil 23 lies against the face surface 13. Here, the seal foil 23 is arranged between two layers 24 of the adhesive 22, hereinafter also referred to as adhesive layers 24, in the height direction 7. In the exemplary embodiments shown, the seal foil 23 has a height 25 running in the height direction 7, hereinafter also referred to as seal foil height 25, which is greater than, in particular at least twice as great as, a height 26 of the respective adhesive layer 24 running in the height direction 7, hereinafter also referred to as adhesive layer height 26.

Correspondingly to the basic shape of the membrane 3, the enclosure 17 has, on the top side 8 and on the bottom side 9, in each case two transverse webs 27 which are situated opposite one another in the longitudinal direction 4 and which run in the transverse direction 5, specifically two upper transverse webs 27a which lie on the top side 8 and two lower transverse webs 27b which lie on the bottom side 9. Furthermore, the enclosure 17 has, on the top side 8 and on the bottom side 9, in each case two longitudinal webs 28 which are situated opposite one another in the transverse direction 5 and which run in the longitudinal direction 4, specifically two upper longitudinal webs 28a which lie on the top side 8 and two lower longitudinal webs 28b which lie on the bottom side 9. The upper webs 18, that is to say the upper transverse webs 27a and the upper longitudinal webs 28a, in this case form an encirclingly closed frame 29, hereinafter also referred to as upper frame 29a. The lower webs 19, that is to say the lower transverse webs 27b and the lower longitudinal webs 28b, likewise form an encirclingly closed frame 29, hereinafter referred to as lower frame 29b.

Thus, in the exemplary embodiments shown, the enclosure 17 runs in encirclingly closed form and thus forms an encirclingly closed gap 20. Furthermore, the seal arrangement 21 is of encirclingly closed form and thus seals off the entire face surface 13, that is to say all face sides 16, of the membrane 3. That is to say, in FIG. 2, the adhesive 22 is present in encirclingly closed form in the manner of a frame. This furthermore means that the seal foil 23 and the adhesive layers 24 are each formed in encirclingly closed fashion in the manner of a frame. Here, in each case one section 38 of the seal arrangement 21, hereinafter also referred to as seal section 38, is arranged between the longitudinal webs 28 and the transverse webs 27.

As can be seen in particular in FIG. 6, multiple membrane assemblies 1 are provided in the associated humidification device 2, which membrane assemblies are arranged so as to follow one another and be spaced apart from one another in the height direction 7. As can be seen for example from FIG. 5, the humidification device 2 is flowed through by air and by a water-containing gas mixture. Here, a flow path 30 of the air, hereinafter also referred to as first flow path 30, and a flow path 31 of the gas mixture, hereinafter also referred to as second flow path 31, lead through the humidification device 2. Here, one of the flow paths 30 leads along the top side 8, and the other flow path 30, 31 leads along the bottom side 9, of the membrane 3 of the respective membrane assembly 1. Humidity is consequently transferred from the gas mixture to the air, and the air is thus humidified.

In the exemplary embodiment shown in FIG. 5, the humidification device 2 is a constituent part of a fuel cell system 32, which furthermore has at least one fuel cell 33, in particular a fuel cell stack 33a. In the fuel cell system 32, the air is fed to the at least one fuel cell 33. Furthermore, a fuel is fed to the at least one fuel cell 33, as indicated by a dashed arrow. Here, water-containing exhaust gas is formed during the operation of the fuel cell 33, which exhaust gas is fed as a gas mixture to the humidification device 2 in order to humidify the air.

Figure 7:
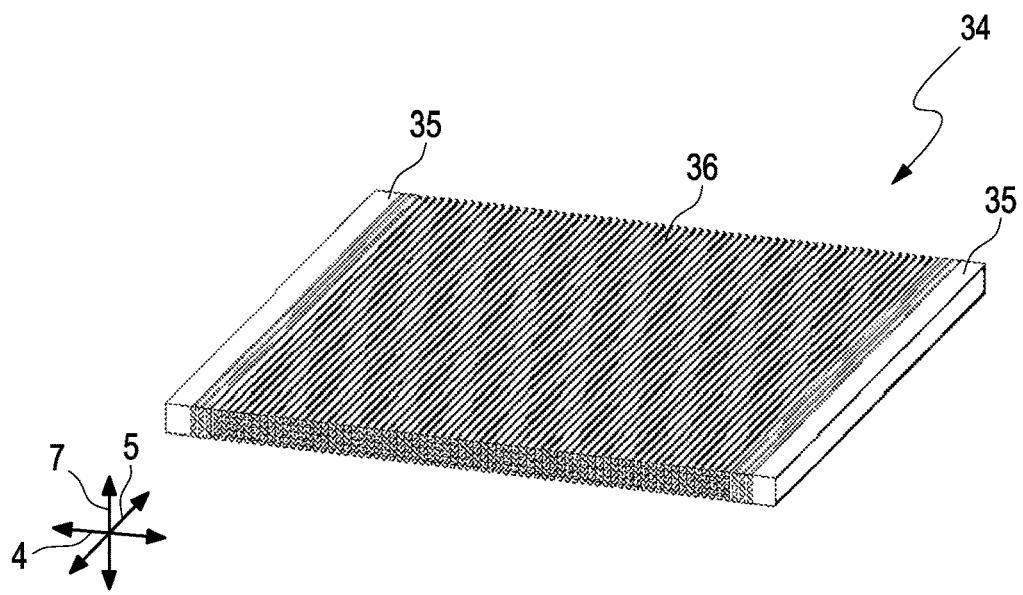
FIG. 7 shows an isometric view of a spacer of the humidification device of FIG. 6.

As can be seen for example from FIG. 6, in the humidification device 2, a spacer 34 is arranged between every two membrane assemblies 1 which follow one another in the height direction 7. Here, the first flow path 30 and the second flow path 31 lead in each case alternately between the membrane assemblies 1 which follow one another in the height direction 7 and thus through the associated spacer 34. FIG. 7 shows one of the spacers 34 used in FIG. 6. Considering FIGS. 6 and 7 together, it can be seen that the respective spacer 34 has, at the outside either in the longitudinal direction 4 or in the transverse direction 5, two oppositely situated holders 35, which are fluid-tight. Between the holders 35, the respective spacer 34 has a guide structure 36 which guides the associated flow path 30, 31 between the associated membrane assemblies 1, in particular membranes 3. FIG. 7 shows, purely by way of example, a spacer 34 which has two holders 35 situated opposite one another in the longitudinal direction 4. As can also be seen in FIGS. 6 and 7, the respective guide structure 36 is aligned parallel to the associated holders 35. The associated flow path 30 is thus guided along the associated holders 35, that is to say either along the longitudinal direction 4 or along the transverse direction 5. The result is thus, as indicated in FIG. 6, flow paths 30, 31 which run transversely with respect to one another at the respective membrane 3 at the top side 8 and at the bottom side 9.

The respective spacer is designed such that the holders 35 overlap the enclosures 17 of the associated membrane assemblies 1, such that the respective guide structure 36 is substantially aligned with the entire top side 8 and bottom side 9 of the associated membranes 3. The respective spacer 34 is fastened by way of the associated holders 35 to the associated enclosures 17 of the associated membrane assemblies 1. For this purpose, in each case one adhesive layer 37 is arranged between the respective holder 35 and the enclosures 17 of the associated membrane assemblies 1.

As can be seen in particular in FIGS. 1 to 4, the adhesive layer 37 of the exemplary embodiments shown is in each case a constituent part of the membrane assembly 1. For this purpose, in a first alternative of the membrane assemblies 1, which is shown in particular in FIGS. 3 and 4, to that side of the respective upper longitudinal web 28a which is averted from the gap 20, there is applied an adhesive strip 37 which extends along the longitudinal web 28a, whereas those sides of the lower longitudinal webs 28b which are averted from the gap 20 are free from adhesive strips 37. Furthermore, to that side of the respective lower transverse web 27b which is averted from the gap 20, there is applied in each case one adhesive strip 37 which extends along the transverse web 27b, whereas those sides of the upper transverse webs 27a which are averted from the gap 20 are free from adhesive strips 37. In a second alternative, which is shown for example in FIG. 2, the transverse webs 27 and the longitudinal webs 28 are provided with adhesive strips 37 in a reversed manner. The second alternative may also be achieved by virtue of the membrane assembly 1 shown in FIGS. 2 and 3 being rotated through 180° about an axis running in the longitudinal direction 4. This means that, in the humidification device 2, identical membrane assemblies 1 are used, wherein membrane assemblies 1 which follow one another in the height direction 7 are arranged in each case so as to be rotated through 180° about the longitudinal direction 4.

As one alternative, it is conceivable for in each case one adhesive strip 37 to be applied to the outer sides, in the height direction 7, of the holders 35 of the spacers 34.

FIG. 8 shows a further exemplary embodiment of the humidification device 2 and of the membrane assemblies 1 and of the spacers 34. This exemplary embodiment differs from the exemplary embodiments shown in FIGS. 1 to 4 and 6 and 7 in that the respective membrane assembly 1 has an alignment structure 39 which protrudes outwards in the extent plane 6, wherein an alignment structure 39 of said type protrudes at the respective corner of the rectangular membrane assemblies 1. Furthermore, the spacers 34 have, on their holders 35, alignment structures 40 which are aligned with and correspond to the alignment structures 39 of the membrane assemblies 1, such that the membrane assemblies 1 and spacers 34 can be positioned and aligned relative to one another by way of the alignment structures 39, 40. This simplifies the production and assembly of the humidification device 2. The alignment structures 39, 40 may form a receptacle, for example for a seal (not illustrated) between the stack of the membrane assemblies 1 and spacers 34 and a housing (not shown) of the humidification device 2, in which housing the stack is accommodated.

The invention claimed is:

1. A membrane assembly for a humidification device of a fuel cell system, the membrane assembly comprising:
a membrane permeable to water and impermeable to air, the membrane extending in a flat form in a longitudinal direction and in a transverse direction that is transverse with respect to the longitudinal direction in an extent plane, and the membrane including (i) in a height direction extending transversely with respect to the longitudinal direction and transversely with respect to the transverse direction a top side and a bottom side averted from the top side, and (ii) an encircling outer margin in the extent plane,
the outer margin having an upper edge at the top side and a lower edge at the bottom side, and an encircling face surface extending between the upper edge and the lower edge,
an enclosure situated externally in the extent plane,
the enclosure including at least one upper web that lies on the top side and at least one lower web that lies on the bottom side, each of the at least one upper and lower webs project outwards beyond the outer margin such that a gap is provided between the at least one upper and lower webs and delimited inwardly by the face surface of the membrane, and a seal arrangement provided in the gap that lies against the face surface of the membrane and is subjected to mechanical load in the height direction by the at least one upper and lower webs and that seals off the face surface.

2. The membrane assembly according to claim 1, wherein the seal arrangement fills the gap.

3. The membrane assembly according to claim 1, wherein the seal arrangement has a sealing adhesive.

4. The membrane assembly according to claim 3, wherein the seal arrangement has a seal foil and two adhesive layers of the adhesive.

5. The membrane assembly according to claim 1, wherein the outer margin has in the longitudinal direction, two oppositely situated transverse margins and, in the transverse direction, two oppositely situated longitudinal margins that each have an associated face side of the face surface.

6. The membrane assembly according to claim 5, wherein the transverse margins extend in the transverse direction, and the longitudinal margins extend in the longitudinal direction.

7. The membrane assembly according to claim 1, wherein the at least one upper web and the at least one lower web are each structured as an encircling frame, between which there is formed the encircling gap that is delimited by the face surface.

8. The membrane assembly according to claim 1, wherein the seal arrangement is of encircling form and seals off the face surface in an encircling fashion.

9. The membrane assembly according to claim 8, wherein:
on a side of the at least one upper web that is averted from the gap, an adhesive strip is disposed that extends along a longitudinal portion of the at least one upper web, whereas sides of the at least one lower web that are averted from the gap are free from adhesive strips along a longitudinal portion of the at least one lower web, and
on a side of the at least one lower web that is averted from the gap, an adhesive strip is disposed that extends along a transverse portion of the at least one lower web, whereas sides of the at least one upper web that are averted from the gap are free from adhesive strips along a transverse portion of the at least one upper web.

10. The membrane assembly according to claim 4, wherein the seal foil is arranged between the adhesive layers in the height direction.

11. The membrane assembly according to claim 1, wherein the enclosure includes (i) in the transverse direction, two oppositely situated upper longitudinal webs of the at least one upper web that lie on the top side, and two oppositely situated lower longitudinal webs of the at least one lower web that lie on the bottom side, and (ii) in the longitudinal direction, two oppositely situated upper transverse webs of the at least one upper web that lie on the top side, and two oppositely situated lower transverse webs of the at least one lower web that lie on the bottom side.

12. The membrane assembly according to claim 11, wherein in the gap between the longitudinal webs and/or the transverse webs, there is arranged in each case one seal arrangement section of the seal arrangement, the seal arrangement section is subjected to mechanical load in the height direction by the longitudinal webs or transverse webs and seals off an associated face side.

13. The membrane assembly according to claim 12, wherein to a side of the respective lower longitudinal web that is averted from the gap, there is applied an adhesive strip that extends along the lower longitudinal web, whereas sides of the upper longitudinal webs that are averted from the gap are free from adhesive strips, and wherein to a side of the respective upper transverse web that is averted from the gap, there is applied in each case one adhesive strip that extends along the upper transverse web, whereas sides of the lower transverse webs that are averted from the gap are free from adhesive strips.

14. A humidification device for humidifying air for a fuel cell system, comprising:
a first flow path for air and a second flow path for a water-containing gas mixture; and
at least two membrane assemblies that are spaced apart from one another in a height direction, such that in each case one of the first and second flow paths leads between the membrane assemblies that follow one another in the height direction; and
wherein at least one of the at least two membrane assemblies include:
a membrane permeable to water and impermeable to air,
the membrane extending in a flat form in a longitudinal direction and in a transverse direction that is transverse with respect to the longitudinal direction in an extent plane, and the membrane including (i) in a height direction extending transversely with respect to the longitudinal direction and transversely with respect to the transverse direction a top side and a bottom side averted from the top side, and (ii) an encircling outer margin in the extent plane,
the outer margin having an upper edge at the top side and a lower edge at the bottom side, and an encircling face surface extending between the upper edge and the lower edge,
an enclosure situated externally in the extent plane,
the enclosure including at least one upper web that lies on the top side and at least one lower web that lies on the bottom side, each of the at least one upper and lower webs project outwards beyond the outer margin such that a gap is provided between the at least one upper and lower webs and delimited inwardly by the face surface of the membrane, and
a seal arrangement provided in the gap that lies against the face surface of the membrane and is subjected to mechanical load in the height direction by the at least one upper and lower webs and that seals off the face surface.

15. The Humidification device according to claim 14, wherein between at least two of the membrane assemblies that follow one another in the height direction, there is arranged a spacer through which at least one of the first and second flow paths runs.

16. The humidification device according to claim 15, wherein the spacer has two fluid-tight holders that are situated opposite one another in a longitudinal direction and/or in a transverse direction, and which hold a guide structure that is arranged between the holders of the spacer for guiding at least one of the first and second flow paths.

17. The humidification device according to claim 16, wherein the humidification device has multiple membrane assemblies that are arranged so as to follow one another in the height direction.

18. The humidification device according to claim 16, wherein the holders are arranged on a side of associated enclosures that is averted from a gap and are fastened to the enclosures.

19. The humidification device according to claim 17, wherein between the membrane assemblies there is arranged a spacer including two holders situated opposite one another in the longitudinal direction and two holders situated opposite one another in the transverse direction.

20. The humidification device according to claim 19, wherein a respective holder is arranged between enclosures of two associated membrane assemblies, and wherein between the holder and the enclosures, there is arranged an adhesive strip that fastens the holder to the enclosures and which extends along the holder.

* * * * *